Patented Feb. 12, 1924.

1,483,233

UNITED STATES PATENT OFFICE.

JOSEPH R. MINEVITCH, OF NEW YORK, N. Y., ASSIGNOR TO DICKS, DAVID & HELLER CO., OF NEW YORK, N. Y., A CORPORATION OF DELAWARE.

PROCESS OF PREPARING TRIPHENYLMETHANE DYES.

No Drawing.   Application filed June 30, 1920.   Serial No. 392,992.

*To all whom it may concern:*

Be it known that I, JOSEPH R. MINEVITCH, a citizen of the United States, and a resident of New York city, county and State of New York, have invented an Improvement in Processes of Preparing Triphenylmethane Dyes, of which the following is a specification.

My invention relates to processes for the preparation of organic substances, especially such processes as include an oxidizing step at one or more of the intermediate stages in the production of such substances. More particularly my process relates to the production of organic dyestuffs, especially such as require an oxidation step in the preparation thereof. My invention finds particular application in the oxidation of the leuco bases of certain dyestuffs, especially the dyestuffs of the triphenylmethane series, such as malachite green. It is an object of the present invention to render the production of such organic substances more economical and efficient by increasing the yield and effecting various economies in manipulation. For example, in the oxidation of the leuco base to the color base of malachite green, I find that I can effect a substantial increase in the yield by means of my process while at the same time so simplifying the manipulation of the process as to effect considerable economies in time, labor, space and equipment.

By way of example I shall describe my invention as applied to the manufacture of malachite green, it being understood that the principles of my invention are not limited to this application which is herein set forth in detail merely by way of illustration.

The leuco base of malachite green, which in the present illustrative example is the particular organic substance which is to be treated in accordance with the process of my invention, may be prepared in the usual manner, as by the condensation of dimethylaniline and benzaldehyde with hydrochloric acid in the well-known manner.

I have discovered that the oxidation of the leuco base, in the particular example given, may be effected in the absence of mineral acid, contrary to the teachings and practice hitherto prevailing in the chemical arts. For this purpose I dissolve the leuco base in a suitable organic, preferably a fatty or equivalent, acid in substantially the entire absence of any mineral acid. For this purpose I prefer to employ acetic acid of a strength necessary to effect the desired solution, which strength I have discovered should be more than about 75 per cent. Preferably I employ strong or even glacial acetic acid in order to make sure that the leuco base will readily dissolve in the organic acid and to counteract dilutions which are often brought about by water present in the leuco base or in the oxidizer afterwards added to oxidize the leuco base to the color base. In the usual case it requires about two parts by weight of glacial acetic acid to readily and completely dissolve about one part by weight of the leuco base.

I now add to the solution of the leuco base in the organic acid the calculated and usual amount of the oxidizing agent required to oxidize the leuco base to the color base. Preferably the oxidizing agent is the usual one employed in this particular case, namely, a paste of lead peroxide. I have discovered that in the absence of mineral acid the oxidation proceeds regularly and without being vigorous, so that as a result of my invention I obtain a much increased yield of the crystalline product and a much reduced yield or even a substantial elimination of the undesirable non-crystalline product which is the result of too vigorous oxidation of the leuco base such as takes place in the presence of mineral acid.

The oxidation proceeds regularly and according to calculation and when it is complete the resulting product will be found to comprise a substantially clear green solution. The solution contains the double acetate of lead and of the crystalline color base of malachite green. The reason that the whole remains in solution is that the acetate of lead, unlike the lead chloride resulting from the usual method employed for oxidizing the leuco base of malachite green, is soluble in water and in aqueous solution of acetic acid. If necessary, or desirable, some water may be added to the solution in order to keep all the solids fully dissolved. During the oxidation, the mixture is kept at a low temperature, as from 0° to 5° C., by any suitable or desirable means.

The green solution of the double acetate of lead and of the crystalline color base of malachite green is poured into a strong solution of Glauber's salt of a sufficient amount to precipitate the lead present in the solution in the form of lead sulphate. The whole is then filtered and the green solution comprising the acetate of the color base of malachite green is poured into a solution of caustic soda, which precipitates the pure crystalline color base of malachite green with the simultaneous production of sodium acetate. The acetic acid may be recovered from the sodium acetate in any suitable manner for further use in the process.

The insoluble carbinol is now filtered, dried and extracted with a suitable solvent, such as toluol, to purify the crystals and to free the same from mineral matter so as to facilitate the production of larger crystals of the dyestuff. The carbinol is now separated out of its solution in toluol, as by steam-distilling the toluol out of the solution containing the carbinol. The purified color base is now added to a strong solution of oxalic acid, with the consequent formation of the oxalate of the color base of malachite green, such oxalate comprising green crystals of the finished product or dyestuff known as malachite green.

It is, of course, to be understood that by the expression "in the absence of mineral acid," I mean that there is no substantial amount of mineral acid initially present, or that no mineral acid is deliberately added. Of course, commercial acetic acid, and other organic acids, often contain small amounts of mineral such as sulphuric acid, and the use of such acid is within the invention as defined in the following claims.

The present invention finds particularly successful application where the organic substances to be oxidized contain one or more methyl derivatives, or groups, which would be transformed into undesirable by-products if the oxidation is too vigorous, as where a substantial amount of mineral acid is present in the oxidation stage.

It is, of course, to be understood that numerous modifications may be made in the foregoing process, as will be apparent to those skilled in the art, without, however, departing from the principle of the present invention as defined in the following claims. For example, I may, in place of acetic acid, use formic acid, even diluted with water in various proportions, as, for example, two parts of formic acid to one part of water and obtain equal or even, in certain cases, superior results.

What I claim is:

1. The method of preparing organic dyestuffs of the triphenylmethane series which comprises dissolving the leuco base of the dyestuff in acetic acid of more than about 75 per cent strength and oxidizing said base in the absence of mineral acid.

2. The method of preparing organic dyestuffs of the triphenylmethane series which comprises dissolving the leuco base of the dyestuff in acetic acid of more than about 75 per cent strength and oxidizing said base with lead peroxide in the absence of mineral acid.

3. The method of preparing malachite green which comprises dissolving the leuco base of malachite green in acetic acid of more than about 75 per cent strength and oxidizing said base in the absence of mineral acid.

4. The method of preparing malachite green which comprises dissolving the leuco base of malachite green in acetic acid of more than about 75 per cent strength and oxidizing said base with lead peroxide in the absence of mineral acid.

5. The method of preparing organic dyestuffs of the triphenylmethane series which comprises dissolving the leuco base of the dyestuff in glacial acetic acid and oxidizing said base in the absence of mineral acid.

6. The method of preparing organic dyestuffs of the triphenylmethane series which comprises dissolving the leuco base of the dyestuff in glacial acetic acid and oxidizing said base with lead peroxide in the absence of mineral acid.

7. The method of preparing malachite green which comprises dissolving the leuco base of malachite green in glacial acetic acid and oxidizing said base in the absence of mineral acid.

8. The method of preparing malachite green which comprises dissolving the leuco base of malachite green in glacial acetic acid and oxidizing said base with lead peroxide in the absence of mineral acid.

In testimony whereof, I have signed my name to this specification this 26th day of June, 1920.

JOSEPH R. MINEVITCH.